United States Patent Office 2,759,921
Patented Aug. 21, 1956

2,759,921
PROCESS FOR THE MANUFACTURE OF FUNCTIONAL DERIVATIVES OF AZO-DYESTUFFS CONTAINING SULFONIC ACID GROUPS

Max Schmid, Riehen, and Rudolph Mory, Liestal, Switzerland, assignors to Ciba Limited, Basel, Switzerland, a Swiss firm No Drawing. Application March 19, 1953, Serial No. 343,501

Claims priority, application Switzerland March 27, 1952

8 Claims. (Cl. 260—200)

According to this invention functional derivatives of azo-dyestuffs containing sulfonic acid groups are made in an advantageous manner by treating an azo-dyestuff, which contains at least one sulfonic acid group and at least one azo linkage bound on both sides to aryl carbon atoms, with a pentavalent phosphorus compound containing at least three halogen atoms in an inert dispensing medium or solvent, and, if desired, condensing the resulting acid halide with a compound containing at least one basic —NH— group or a hydroxyl group.

The azo-dyestuffs used as starting materials for making the acid halides may contain one, two or more sulfonic acid groups. They must also contain at least one azo linkage bound on each side to an aryl carbon atom, and may contain further azo linkages bound to any desired carbon atoms. Especially suitable starting materials are, for example, monoazo-dyestuffs which contain one or two sulfonic acid groups. The azo-dyestuffs may be further substituted in any desired manner. As a rule, however, it is desirable to use dyestuffs which, apart from a hydroxyl group present, for example, in ortho-position to an azo linkage, contain no substituents such, for example, as primary amino groups, which are capable of reacting with the aforesaid phosphorus compounds, in so far as reaction with such substituents is not desired or is disadvantageous. As substituents of this kind there may be mentioned above all carboxylic acid groups, which are converted into carboxylic acid halide groups by reaction with phosphorus pentahalides.

As monoazo-dyestuffs of the aforesaid kind there may be used, for example, those in which the azo linkage is bound to a benzene nucleus, on the one side, and to a naphthalene nucleus, on the other. Large numbers of such dyestuffs can easily be made in known manner by coupling a diazo-compound of the benzene series with a hydroxynaphthalene capable of coupling, advantageously, in ortho-position to the hydroxyl group, at least one of the starting materials containing at least one sulfonic acid group. The azo component or more especially the diazo-component may contain further substituents in addition to the aforesaid substituents. Thus, for example, there come into consideration as diazo-components aminobenzenes which may contain the following substituents: Nitro groups, alkyl groups such as ethyl or methyl, alkoxy groups such as ethoxy or methoxy, halogen atoms such as fluorine, bromine or especially chlorine, trifluoromethyl groups, carboxylic acid groups, acylamino groups, aryl-azo groups, aryl sulfone groups or aryloxy groups.

Apart from these dyestuffs, there may be used other monoazo-dyestuffs of the kind hereinbefore defined, for example, those in which the azo linkage is bound on each side to a naphthalene nucleus and which can be made, for example, by coupling a diazotized aminonaphthalene, such as 1- or 2-aminonaphthalene, 1-aminonaphthalene-4-sulfonic acid or 2-aminonaphthalene-4:8-disulfonic acid with a hydroxynaphthalene or hydroxynaphthalene sulfonic acid.

The starting materials may be reacted in the form of the free acids or alkali salts thereof, and in the case of dyestuffs which contain more than one sulfonic acid group only a part of the groups need be present in the form of alkali sulfonate groups. Depending on the constitution it may sometimes be of advantage to use the starting materials in one or other form for reaction with the phosphorus compound.

As pentavalent phosphorus compounds containing at least three halogen atoms there may be used in the present process, for example, phosphorus oxybromide or phosphorus oxychloride, and especially phosphorus pentahalides such as phosphorus pentabromide or especially phosphorus pentachloride. The phosphorus pentahalide may be used in conjunction with a phosphorus oxyhalide, the latter not serving primarily as a halogenating agent but as an inorganic dispersing medium. In the case of reaction with a phosphorus oxyhalide an excess of the latter may be used as a dispersing medium.

The treatment with the phosphorus compound, for example, with phosphorus pentabromide or phosphorus pentachloride, is carried out in a dispersing medium or solvent which is inert towards these phosphorus compounds. For this purpose it is of advantage to use an organic dispersing medium. As inert organic dispersing media there come into consideration, for example, hydrocarbons such as benzene, toluene, xylenes, substituted benzenes such as nitrobenzene, monochlorobenzene, the di- and tri-chlorobenzenes liquid at room temperature, and also compounds of a different kind such as dioxane or mixtures of dispersing media of the kind referred to above.

When the starting materials, that is to say the dyestuff and/or dispersing medium, still contains water, the latter can in some cases be removed with advantage by azeotropic distillation. The reaction with the phosphorus compound is usually carried out with advantage at a low temperature, for example, at room temperature. Depending on the choice of the dispersing medium and the constitution of the dyestuff the favourable reaction temperature may vary, so that in some cases, at least at the outset of the reaction, it may be advisable to cool the mixture, whereas in other cases gentle heating may be desirable after the reaction has been commenced at room temperature. If the reaction conditions are too energetic there is a risk of side reactions. For example, hydroxyl groups present in the dyestuff molecule may be replaced partially or completely by halogen atoms, and this is not usually desired, in view of the fact that the halogen compounds possess substantially weaker dyeing properties than the hydroxy-compounds.

The sulfonic acid halides obtainable by the present process can be recovered from the reaction mixture by known methods, for example, by pouring the mixture on to ice, which is recommended in the case of dispersing media such as dioxane which are miscible with water, and then filtering the mixture, washing the radical free from acid, and cautiously drying the product, for example, in vacuo at a moderately raised temperature. When the reaction mixture contains a dispersing medium which is sparingly soluble or insoluble in water, it is usually of advantage after the reaction and, if desired, after allowing the mixture to cool to filter off the resulting sulfonic acid halide, insofar as the latter is sparingly soluble in the cold in the dispersing medium used. If it is easily soluble and does not precipitate sufficiently in the cold, it can usually be precipitated from the solution by diluting the latter with another solvent such, for example, as petroleum ether. The acid halides so obtained in general crystallize well from organic solvents such as benzene, chlorobenzene, nitrobenzene, ligroin, glacial acetic acid, acetone, trichlorethylene and the like, and can therefore usually be obtained in an analytically pure state.

The sulfonic acid halides obtained by the reaction of the sulfonated dyestuffs with the phosphorus compounds may be reacted by methods in themselves known with any desired compounds which are capable of reacting with sulfonic acid halides. Valuable products are usually obtained by condensing the acid chlorides, that is to say the azo dyestuffs which contain at least one sulfonic acid halide group and at least one azo linkage bound on both sides to aryl carbon atoms, with compounds which contain at least one basic —NH— group or at least one hydroxyl group.

In addition to ammonia there may be used for this condensation a very wide variety of primary and secondary mono-, di- and poly-amines. In order to ensure a unitary course of reaction it is usually of advantage to react sulfonic acid halides which contain more than one sulfonic acid halide group or in addition to one such group a carboxylic acid halide group, with monamines. For the same reason it is of advantage to condense di- or poly-amides with monosulfonic acid halides containing no further reactive halogen atoms.

The choice of the amines may also be suited to the purpose in view. If the resulting sulfonic acid amide is required to be soluble to some extent in water or alkalis, it is of advantage to use ammonia or a primary amine of low molecular weight such as monomethylamine or monoethylamine, monoethanolamine or amines which contain a group imparting solubility in water, such as aminoacetic acid (glycocoll), N-methylaminoacetic acid, aminoethane sulfonic acid (taurine) or 1-aminobenzene-4- sulfonic acid. The presence of more than one such sulfonic acid amide group in the dyestuff molecule (see the preceding paragraph) in general also increases the solubility in water.

When it is desired that the sulfonic acid amide shall possess as low a solubility in water as possible, it is of advantage to condense the monosulfonic acid halide with an amine of which the molecular weight is not too small such as aniline, an aminonaphthalene, an aminoanthraquinone, aminopyrene or aminochrysene. Secondary amines of this kind, for example, the aforesaid arylamines, but in which one of the hydrogen atoms bound to the nitrogen atom is replaced by a methyl or ethyl group, are of especial interest. In this connection special mention should also be made of the condensation of monosulfonic acid halides with diamines in the molecular ratio 2:1. There may be used, for example, cyclic diamines, for example those which contain two secondary amino groups. As examples there may be mentioned: Diamines of the benzene series, for example, mononuclear diamines such as 1:4-diaminobenzene or 1:4-diamino-2:5-dialkoxybenzenes; di- or polynuclear amines such as 4:4'-diaminodiphenyl, or 3:3'-dichloro-, 3:3'-dimethyl- or 3:3'-dimethoxy-4:4'-diaminodiphenyl; diamines of the benzene series in which two similarly or differently substituted benzene nuclei are linked together by a suitable bridging member, for example, by oxygen, —SO$_2$— as in the case of 4:4'-diaminodiphenylsulfone, —CO— as in the case of 3:3'-diaminodiphenylketone, —CH$_2$— as in the case of 3:3'-diamino - 4:4' - dichlorodiphenyl - methane, —NH—CO—, —NH—CO—HN—, —SO$_2$—NH$_2$—, —CH=CH— —CH$_2$—CH$_2$—, —NH— and —N=N—; aromatic diamines of other types such as 2:8-diaminochrysene, 2:6- or 1:5 - diaminonaphthalene, 2 - (4' - aminophenyl) - 6-aminobenzthiazole; diamines containing one or two secondary amino groups such as 4:4'-di-(methylamino)-diphenyl and 4:4'-di-(methylamino)-diphenyl sulfone.

The condensation of the sulfonic acid halides with the amines is usually carried out with advantage in an anhydrous medium. It usually takes place surprisingly easily even at temperatures within the boiling range of normal organic solvents such as benzene, acetone, toluene, monochlorobenzene, dichlorobenzene and nitrobenzene. In order to accelerate the reaction it is often desirable to use an acid-binding agent such as anhydrous sodium acetate or pyridine. When the condensation is carried out with ammonia or monamines, an excess of the base used can usually serve with advantage as the acid-binding agent.

As already mentioned the acid halides may also be condensed with compounds which contain a hydroxyl group, especially a phenolic hydroxyl group. As examples of such compounds there may be mentioned, apart from phenol itself, substituted hydroxybenzenes such as 4-methyl-1-hydroxybenzene, 4-nitro-1-hydroxybenzene, 4-methyl-2-nitro-1-hydroxybenzene, and hydroxynaphthalenes such as 1- or 2-hydroxynaphthalene, and also hydroxydiphenyl, 3-hydroxydiphenylene oxide or sulfide or N-methyl-3-hydroxycarbazole.

In this case also monosulfonic acid halides may be reacted with dihydroxy compounds in the molecular ratio 2:1 or in the molecular ratio $n$:1 in the case of hydroxycompounds containing $n$-hydroxyl groups. As examples there may be mentioned dihydroxybenzenes such as 1:3- or 1:4-dihydroxybenzene and dihydroxynaphthalenes such as 1:5- or 2:6-dihydroxynaphthalene.

The condensation with the hydroxy compound is also carried out with advantage in an organic solvent (see above) and with the addition of an acid-binding agent.

It is also possible to condense a dyestuff sulfonic acid halide with an amino-hydroxy-aryl compound, such as 1-amino-3- or -4-hydroxybenzene, 1-amino-7-hydroxynaphthalene or 2-amino-6- or -7-hydroxynaphthalene, in the molecular ratio 2:1.

Although the number of easily accessible diazo- and azo-components which contain sulfonic acid amide or sulfonic acid aryl ester groups necessary for making the azo-dyestuffs is rather limited, very many components containing sulfonic acid groups are known. Accordingly, the present process for making sulfonic acid halides of azo dyestuffs and further embodiments thereof enables azo dyestuffs to be made in a simple manner, which contain sulfonic acid amide groups or sulfonic acid ester groups, and which could not be made hitherto or could be made only with difficulty.

The sulfonic acid amides or esters obtainable by the process described above can be used for various purposes. In the case of those which are sufficiently soluble in water they can be used, for example, for dyeing textiles from aqueous baths. Those which are insoluble or sparingly soluble in water and in the usual organic solvents can be used with advantage as pigments. Some of the products having the characteristic properties referred to above and usually also those not possessing these two properties, are suitable for the production of colored masses or lacquers.

It has already been proposed to convert azo dyestuffs containing sulfonic acid groups into the corresponding sulfonic acid chlorides by means of chlorosulfonic acid (see Chemisches Zentralblatt 1934, vol. I, page 4934). As compared with the present process, which generally leads to good yields and sulfonic acid halides of high purity, the reactions of the aforesaid known processes do not proceed satisfactorily.

In view of the prior art it would have been expected that the action of phosphorus halides on azo-dyestuffs, which contain hydroxyl groups in addition to sulfonic acid groups, would also lead to attack upon the hydroxyl groups. It is therefore quite unexpected that the present process, in which dyestuffs containing reactive hydroxyl groups are reacted with phosphorus halides and the reaction is carried out in a dispersing medium, could easily be carried out without the hydroxyl groups entering into reaction.

The following examples illustrate the invention, the parts and percentages being by weight unless otherwise stated, and the relationship of parts by weight to parts

Example 1

34.2 parts of the dyestuff sulfonic acid obtained by coupling diazotized 1-amino-4-methylbenzene with 2-hydroxynaphthalene-6-sulfonic acid are stirred in 150 parts by volume of dry dioxane for a short time at room temperature. There are then introduced at room temperature 31 parts of phosphorus pentachloride in small portions in the course of ½ hour. After stirring for several hours at room temperature the whole is mixed with ice, then filtered with suction, and the filter residue is washed with cold water until completely free from acid. The orange colored chlorination product obtained after drying at 40–50° C. in vacuo can be purified by crystallization from benzene and then melts at 190° C.

By using, instead of 34.2 parts of the above dyestuff 30 parts of the dyestuff acid obtained by coupling diazotized 1-amino-2:5-dichlorobenzene with 2-hydroxynaphthalene-6-sulfonic acid, and otherwise proceeding in the manner described in this example, there is obtained a brilliant orange colored chloride melting at 197° C.

By starting from 32.8 parts of the dyestuff sulfonic acid obtained by coupling diazotized 1-aminobenzene-4-sulfonic acid with 2-hydroxynaphthalene, and otherwise proceeding in the manner described in this example, there is obtained a brown-red chloride which melts at 200° C. with decomposition, after recrystallization from benzene.

By starting from 44.7 parts of the dyestuff sulfonic acid obtained by coupling diazotized 1-aminobenzene-4-sulfonic acid with 2-hydroxynaphthalene-3-carboxylic acid phenylamide, and otherwise proceeding as described in this example, there is obtained in good yield the corresponding dyestuff sulfonic acid chloride in the form of a red powder.

Example 2

37.6 parts of the dyestuff sulfonic acid, obtained by coupling diazotized 1-amino-2-methyl-4-chlorobenzene with 2-hydroxynaphthalene-6-sulfonic acid, are mixed with 200 parts by volume of dry chlorobenzene, and 50 parts by volume of liquid is distilled from the mixture in order to bring about complete dehydration. The mixture is then mixed, while cooling with ice, in the course of ½ hour in portions with 41 parts of phosphorus pentachloride, and the mixture is then stirred for 16 hours while continuously cooling with ice. After filtering the mixture with suction and washing the filter residue with petroleum ether, the dyestuff sulfonic acid chloride is obtained in the form of a scarlet powder.

By using instead of 41 parts of phosphorus pentachloride, 86 parts of phosphorus pentabromide and otherwise proceeding in the manner described above, the corresponding dyestuff sulfonic acid bromide is obtained in good yield.

Example 3

A moist paste of the dyestuff salt, obtained by diazotizing 51.75 parts of 1-amino-2-nitro-4-chlorobenzene and then coupling the diazo compound with 91.2 parts of 2-hydroxynaphthalene-3:6-disulfonic acid at a pH value of about 8, is stirred in 3000 parts by volume of water, then rendered strongly acid to Congo with 200 parts by volume of hydrochloric acid of 30 per cent strength, stirred for a few hours at room temperature then filtered with suction, and the filter residue is pressed, rapidly dried and ground. The dyestuff obtained in this manner is mixed with 1200 parts by volume of dry chlorobenzene and 300 parts by volume of the toluene are distilled from the mixture in order to bring about complete dehydration. After cooling the suspension there are introduced in small portions in the course of ½ hour 250 parts of phosphorus pentachloride, the mixture is then heated in the bath for 16 hours at 70–80° C. The whole is then allowed to cool, and the crystalline product is filtered off with suction, washed with petroleum ether and dried in vacuo at 30–40° C.

In the same manner there can be obtained the disulfonic acid dichlorides of the dyestuffs obtained by coupling with 2-hydroxynaphthalene-3:6-disulfonic acid the diazo components mentioned below:

1-amino-2:5-dichlorobenzene,
1-amino-4-methylbenzene,
1-amnio-2-methyl-4-chlorobenzene,
1-amino-2-methyl-5-chlorobenzene,
1-amino-2-methyl-4-nitrobenzene,
1-amino-2-chlorobenzene,
1-amino-2-methyl-5-nitrobenzene,
1-amino-2-nitro-4-methylbenzene,
1-amino-4-nitrobenzene,
1-amino-3-chlorobenzene,
1-amino-2-chloro-5-trifluoromethylbenzene,
1-amino-2-trifluoromethyl-4-chlorobenzene,
1-amino-2-nitro-4-methoxybenzene,
1-amino-2:5-dimethoxy-4-chlorobenzene,
1-amino-2-methoxy-5-chlorobenzene, 2-amino-4:4′ - dichloro-1:1′-diphenyl ether.

Example 4

20 parts of the finely pulverized dyestuff sulfonic acid-carboxylic acid, obtained by coupling diazotized 1-amino-2-chlorobenzene-5-carboxylic acid with 2-hydroxynapthalene-6-sulfonic acid, are suspended in 150 parts by volume of dry dioxane, and the whole is then mixed in the course of ½ hour at ordinary temperature in portions with 41.6 parts of phosphorus pentachloride. The chlorination mixture is then maintained for 16 hours at room temperature, while stirring. It is then introduced into ice, filtered with suction, and the filter residue is washed with cold water until the washings are free from acid and colorless. The dichloride has a red-orange color and can be purified by recrystallization from benzene.

Example 5

36 parts of the dyestuff sulfonic acid chloride, obtained from the dyestuff sulfonic acid obtainable by coupling diazotized 1-amino-4-methylbenzene with 2-hydroxynaphthalene-6-sulfonic acid (as described in Example 1), are introduced into 400 parts by volume of dry benzene. A feeble current of dry ammonia gas is then introduced for 2¼ hours onto the surface of the stirred suspension of the chloride, during which a distinct change in form occurs. The whole is stirred for a few hours at room temperature, then filtered with suction and the filter residue is dried in vacuo. For the purpose of purification the dyestuff sulfonic acid amide may be recrystallized from dilute acetone.

Example 6

23 parts of the dyestuff sulfonic acid chloride, prepared as described in Example 2, are mixed in 200 parts by volume of dry benzene with 19.3 parts of N-methyl aniline, and the mixture is heated for 3 hours at the boil under reflux. Complete dissolution takes place. Upon cooling while stirring crystallization takes place. The solid product is filtered off with suction, dried, extracted with dilute hydrochloric acid and then with dilute sodium hydroxide solution, and finally washed free from alkali with water. After being dried, the sulfonic acid N-methyl-phenylamide of the dyestuff is obtained in good yield in the form of a red-orange powder soluble in concentrated sulfuric acid with a red coloration. For further purification it may be recrystallized from benzene.

Example 7

12.5 parts of the dyestuff sulfonic acid chloride, obtained from the dyestuff sulfonic acid prepared by coupling diazotized 1-amino-2:5-dichlorobenzene with 2-hydroxynaphthalene-6-sulfonic acid as described in Example 1, are mixed in 150 parts by volume of acetone with 5.6 parts of aniline. The mixture is then heated for several hours at the boil under reflux (bath temperature of 60–70° C.). The whole is then cooled while stirring, and the condensation product is filtered off with suction, washed with water and dried. For further purification the dyestuff sulfonic acid phenylamide may be recrystalized from glacial acetic acid.

*Example 8*

37.3 parts of the dyestuff sulfonic acid chloride, obtained from the dyestuff sulfonic acid prepared by coupling diazotized 1-aminobenzene-4-sulfonic acid with 2-hydroxynaphthalene-3-carboxylic acid phenylamide and chlorinated with phosphorus pentachloride in chlorobenzene at 50–60° C., are heated in 300 parts by volume of dry chlorobenzene with 9.4 parts of 4:4'-diamino -3:3'-dimethyl-1:1'-diphenyl slowly up to the boiling point of the chlorobenzene, and the mixture is maintained at that temperature for 16 hours. The whole is then allowed to cool, filtered with suction, and the dyestuff powder is washed well with chlorobenzene, then with alcohol and dried. The product has a scarlet red color and dissolves in concentrated sulfuric acid with a red-violet coloration.

*Example 9*

14 parts of the dyestuff sulfonic acid chloride, obtained from the dyestuff sulfonic acid prepared by coupling diazotized 1-aminobenzene-4-sulfonic acid with 2-hydroxynaphthalene as described in Example 1, are mixed in 200 parts by volume of dry benzene at ordinary temperature with 3.7 parts of 4:4'-diamino-1:1'-diphenyl and 3.2 parts of pyridine. The mixture is heated for 22 hours under reflux to boil the benzene, and then cooled. It is then filtered with suction, and the filter residue is washed with benzene and dried. After extraction with water and acetone, and after drying, the condensation product is obtained in good yield in the form of an orange powder.

*Example 10*

18.5 parts of the dyestuff disulfonic acid dichloride, obtained from the dyestuff disulfonic acid prepared by coupling diazotized 1-amino-4-methylbenzene with 2-hydroxynaphthalene-3:6-disulfonic acid as described in Example 3, are mixed with 250 parts by volume of dry benzene, then with 21.4 parts of N-methylaniline, and the mixture is heated at the boil under reflux for 1½ hours. After cooling, the unitary crystallisate consisting of red needles is filtered off with suction and then dried. It is then after-treated with dilute hydrochloric acid and thoroughly washed with water. The red dyestuff disulfonic acid di(N-methyl-N-phenylamide), which dissolves in concentrated sulfuric acid with an orange-red coloration, can be obtained in an analytically pure form by recrystallization from glacial acetic acid.

In a manner such as is described in Examples 5–10 the dyestuff mono-, di- and tri-sulfonic acids obtainable from the diazo components given in column I and the azo components given in column II of the following Table are reacted by way of the dyestuff mono-, di- and tri-sulfonic acid chlorides with 1, 2 or 3 mols of the compounds given in column III. These compounds usually have melting points above 200° C.

| I | II | III |
| --- | --- | --- |
| 1-Amino-4-methyl benzene. | 2-hydroxynapthalene-6-sulfonic acid. | 4:4'-diamino-3:3'-dimethyl-1:1'-diphenyl.[1] |
| Do | do | aniline. |
| Do | do | 1-amino-2-chlorobenzene. |
| Do | do | dimethylamine. |
| Do | do | N-methyl-aminoacetic acid. |
| Do | do | morpholine. |
| 1-amino-2-methyl-4-chlorobenzene. | do | aniline. |
| 1-amino-2:5-dichlorobenzene. | do | N-methyl-aniline. |
| 1-aminobenzene-4-sulfonic acid. | 2-hydroxynaphthalene-3-carboxylic acid phenylamide. | morpholine. |
| Do | 2-hydroxynaphthalene. | N-methyl-aniline. |
| Do | do | 1-aminoanthraquinone. |
| Do | do | morpholine. |
| Do | do | dimethylamine. |
| 1-amino-2:5-dichlorobenzene. | 2-hydroxynaphthalene-6-sulfonic acid. | Do. |
| 1-amino-4-methylbenzene. | do | N-methyl-aniline. |
| Do | do | 1:5-diaminonaphthalene.[1] |
| 1-amino-2-nitro-4-chlorobenzene. | do | N-methyl-aniline. |
| Do | do | morpholine. |
| 1-amino-2-nitro-4-methylbenzene. | do | N-methyl-aniline. |
| Do | do | morpholine. |
| 1-amino-2:5-dichlorobenzene. | 2-hydroxynaphthalene-3:6-disulfonic acid. | N-methylaniline. |
| Do | do | morpholine. |
| 1-amino-4-methylbenzene. | do | Do. |
| Do | do | 1-amino-2:5-dichlorobenzene. |
| Do | do | 1-amino-4-phenylbenzene. |
| 1-amino-2-methyl-4-chlorobenzene. | do | N-methylaniline. |
| Do | do | morpholine. |
| 1-amino-2-methyl-5-chlorobenzene. | do | N-methylaniline. |
| Do | do | morpholine. |
| Do | do | 1-amino-4-phenylbenzene. |
| Do | do | N-ethylaniline. |
| Do | do | 1-amino-2-methoxybenzene. |
| 1-amino-2-methyl-4-nitrobenzene. | do | N-methylaniline. |
| 1-amino-2-chlorobenzene. | do | morpholine. |
| Do | do | N-methylaniline. |
| 1-amino-2-methyl-5-nitrobenzene. | do | morpholine. |
| Do | do | N-methylaniline. |
| 1-amino-2-nitro-4-chlorobenzene. | do | morpholine. |
| Do | do | N-methylaniline. |
| 1-amino-2-nitro-4-methylbenzene. | do | morpholine. |
| Do | do | N-methylaniline. |
| 1-amino-2-nitro-4-methoxybenzene. | do | morpholine. |
| Do | do | N-methylaniline. |
| 1-amino-4-nitrobenzene. | do | ammonia. |
| Do | do | morpholine. |
| Do | do | N-methylaniline. |
| 1-amino-3-chlorobenzene. | do | morpholine. |
| Do | do | N-methylaniline. |
| 1-amino-2-choloro-5-trifluoromethylbenzene. | do | morpholine. |
| Do | do | N-methylaniline. |
| 1-amino-2-trifluoromethyl-4-chlorobenzene. | do | morpholine. |
| Do | do | N-methylaniline. |
| 1-aminobenzene-4-sulfonic acid. | do | Do. |
| 1-amino-2:4-dichlorobenzene-5-sulfonic acid. | do | Do. |
| 2-amino-1:1'-diphenyl-sulfone-4-sulfonic acid. | do | Do. |
| 1-amino-4-methylbenzene-5-sulfonic acid. | 2-hydroxynaphthalene-3-carboxylic acid phenylamide. | Do. |
| 1-amino-2-chlorobenzene-5-carboxylic acid. | 2-hydroxynaphthalene-6-sulfonic acid. | methylaniline. |
| 1-amino-2-methyl-4-chlorobenzene. | do | morpholine. |
| 1-amino-2-methyl-5-nitrobenzene. | do | Do. |
| Do | do | methylaniline. |
| 1-amino-2-methoxy-5-nitrobenzene. | do | Do. |
| 1-amino-2-chlorobenzene-5-sulfonic acid. | 2-hydroxynaphthalene-3-carboxylic acid phenylamide. | Do. |
| 1-amino-2-methylbenzene-5-sulfonic acid. | do | Do. |
| Do | do | morpholine. |
| 1-amino-4-methylbenzene-5-sulfonic acid. | do | Do. |

[1] 1 mol of this amine condensed with 2 mols of the acid chloride.

| I | II | III |
|---|---|---|
| 1-amino-2-methoxy-5-chlorobenzene. | 2-hydroxynaphthalene-3:6-disulfonic acid. | morpholine. |
| Do | do | methylaniline. |
| 1-amino-2-methoxy-5-chlorobenzene. | do | aniline. |
| 1-amino-2:5-dimethoxy-4-chlorobenzene. | do | ammonia. |
| 2-amino-4:4'-dichloro-1:1'-diphenylether. | do | morpholine. |
| Do | do | methylaniline. |
| 1-amino-2-methoxy-4-nitrobenzene. | do | Do. |
| 2-amino-1:1'-diphenylsulfone-4-sulfonic acid. | 2-hydroxynaphthalene-3-carboxylic acid phenylamide. | Do. |
| 1-amino-2:4-dichlorobenzene-5-sulfonic acid. | do | Do. |
| 1-amino-2-nitrobenzene-4-sulfonic acid. | 2-hydroxynaphthalene-3-carboxylic acid phenylamide. | Do. |
| 1-amino-2-methoxybenzene-5-sulfonic acid. | 2-hydroxynaphthalene-3-carboxylic acid-(2'-methoxy)-phenylamide. | Do. |
| 1-aminobenzene-4-sulfonic acid. | do | Do. |
| 1-amino-4-methylbenzene-5-sulfonic acid. | do | Do. |
| Do | do | morpholine. |
| Do | do | di-n-butylamine. |
| Do | do | diethylamine. |
| 2-amino-1:1'-diphenylsulfone-4-sulfonic acid. | do | methylaniline. |
| 1-aminobenzene-3-sulfonic acid. | do | morpholine. |
| Do | do | methylaniline. |
| 1-amino-2-methyl-5-chlorobenzene. | 2-hydroxynaphthalene-6-sulfonic acid. | Do. |
| Do | do | morpholine. |
| 1-amino-2-chlorobenzene. | do | methylaniline. |
| Do | do | morpholine. |
| 1-amino-2-nitro-4-methoxybenzene. | do | Do. |
| Do | do | methylaniline. |
| 1-amino-4-nitrobenzene. | do | Do. |
| Do | do | morpholine. |
| Do | do | methylaniline. |
| 1-amino-3-chlorobenzene. | do | morpholine. |
| 1-amino-2-chloro-5-trifluoromethylbenzene. | do | methylaniline. |
| Do | do | morpholine. |
| 1-amino-4-chloro-6-trifluoromethylbenzene. | do | Do |
| Do | do | morpholine. |
| 1-amino-2-methoxy-4-nitrobenzene. | do | Do. |
| 1-amino-4-methylbenzene-5-sulfonic acid. | 2-hydroxynapthalene-3-carboxylic acid-(2'-methyl)-phenylamide. | Do. |
| Do | do | methylaniline. |
| Do | 2-hydroxynaphthalene-3-carboxylic acid-(4'-methoxy)-phenylamide. | Do. |
| Do | do | morpholine. |
| Do | 2-hydroxynaphthalene-3-carboxylic acid-(3'-nitro)-phenylamide. | methylaniline. |
| Do | 2-hydroxynaphthalene-3-carboxylic acid-(2'-methyl-4'-chloro)-phenylamide. | morpholine. |
| Do | 2-hydroxynaphthalene-3-carboxylic acid-α-naphthylamide. | Do. |
| Do | do | methylaniline. |
| Do | 2-hydroxynaphthalene-3-carboxylic acid-β-naphthylamide. | morpholine. |
| Do | do | methylaniline. |
| Do | 2-hydroxynaphthalene-3-carboxylic acid-(2'-methoxy-5'-chloro)-phenylamide. | Do. |
| Do | do | morpholine. |
| Do | 2-hydroxynaphthalene-3-carboxylic acid-(4'-chloro)-phenylamide. | Do. |
| Do | do | methylaniline. |

| I | II | III |
|---|---|---|
| 1-amino-4-methylbenzene-5-sulfonic acid. | 2-hydroxynaphthalene-3-carboxylic acid-(2':5'-dimethoxy)-phenylamide. | methylaniline. |
| Do | do | morpholine. |
| Do | 2-hydroxynaphthalene-3-carboxylic acid-(4'ethoxy)-phenylamide. | Do. |
| Do | 2-hydroxynaphthalene-3-carboxylic acid-(2'-ethoxy)-phenylamide. | Do. |
| Do | do | methylaniline. |
| 1-aminoaphthalene-4-sulfonic acid. | 2-hydroxynaphthalene-3-carboxylic acid-(2'-methoxy)-phenylamide. | morpholine. |
| 1-amino-2-methyl-5-chlorobenzene. | 1-hydroxynaphthalene-4-sulfonic acid. | Do. |
| Do | 2-hydroxynaphthalene-4-sulfonic acid. | Do. |
| Do | do | methylaniline. |
| Do | 1-hydroxynaphthalene-5-sulfonic acid. | Do. |
| 1-amino-2:5-dichlorobenzene. | 1-hydroxynaphthalene-4-sulfonic acid. | morpholine. |
| Do | do | methylaniline. |
| 1-amino-4-nitrobenzene. | do | Do. |
| Do | do | morpholine. |
| 1-amino-2:5-dichlorobenzene. | 1-hydroxynaphthalene-5-sulfonic acid. | Do. |
| Do | do | methylaniline. |
| 1-amino-4-nitrobenzene. | do | Do. |
| Do | do | morpholine. |
| 1-amino-2-nitro-4-methylbenzene. | 2-hydroxynaphthalene-6-sulfonic acid. | di-n-butylamine. |
| Do | do | diethylamine. |
| Do | do | 1-amino-2-methoxybenzene. |
| Do | do | n-butylamine. |
| Do | do | 1:4-diaminobenzene (condensation of 1 mol of this diamine with 2 mols of the acid chloride). |

*Example 11*

21.6 parts of the dyestuff disulfonic acid dichloride, obtainable as described in Example 3 from the dyestuff prepared by coupling diazotized 1-amino-2-chlorobenzene with 2-hydroxynaphthalene-3:6-disulfonic acid, are heated in 150 parts by volume of dry benzene with 9.3 parts of hydroxybenzene and 7.2 parts of pyridine in a bath for 4½ hours while stirring at 80–90° C. The mixture is then further stirred while allowing it to cool, and the solid product is filtered off with suction and dried. For purification it is pasted in water and thoroughly washed with water, sodium carbonate solution of 1 per cent. strength and finally again with water. The scarlet pigment obtained in this manner dissolves in concentrated sulfuric acid with a red-orange coloration.

*Example 12*

23 parts of the dyestuff, obtained by coupling diazotized 1-amino-4-methylbenzene-5-sulfonic acid with 2-hydroxynaphthalene-3-carboxylic acid phenyl amide, are covered with 170 parts of phosphorus oxychloride, and the mixture is heated for 3 hours in a water bath at 70–80° C., while stirring. The reaction mixture is then cooled, poured on to ice, filtered with suction, and the filter residue is washed until the washing water is colorless and free from acid. The yield of the crystalline product, after drying in vacuo at 30–40° C., is about 20 parts. The dyestuff chloride has a red color and can be recrystallized from chlorobenzene.

By starting from 50 parts of the dyestuff disodium salt obtained by coupling diazotized 1-amino-2-methyl-5-chlorobenzene with 2-hydroxynaphthalene-3:6-disulfonic acid, and 287 parts of phosphorus oxychloride and otherwise proceeding in the manner described above, the corresponding dyestuff disulfonic acid dichloride is obtained in good yield in the form of a red powder.

What is claimed is:

1. A process for preparing a functional derivative of a monoazo dyestuff sulfonic acid which comprises reacting in an inert diluent under substantially anhydrous conditions a monoazo dyestuff, the azo linkage of which interconnects two aryl nuclei selected from the group consisting of benzene and naphthalene nuclei, the said monoazo dyestuff bearing a single hydroxy group in ortho position to the said azo linkage and also bearing a sulfonic acid group as single substituent which reacts with phosphorus halides, with a halogen compound of pentavalent phosphorus containing at least three halogen atoms selected from the group consisting of chlorine and bromine atoms, and recovering the sulfonic acid halide thus formed.

2. A process for preparing a functional derivative of a monoazo dyestuff sulfonic acid which comprises reacting with phosphorus pentachloride in an inert diluent under substantially anhydrous conditions a monoazo dyestuff, the azo linkage of which interconnects two aryl nuclei selected from the group consisting of benzene and naphthalene nuclei, the said monoazo dyestuff bearing a single hydroxy group in ortho position to the said linkage and also bearing a sulfonic acid group as single substituent which reacts wtih phosphorus halides, and recovering the sulfonic acid chloride thus formed.

3. A process for preparing a functional derivative of a monoazo dyestuff sulfonic acid which comprises reacting with phosphorus pentabromide in an inert diluent under substantially anhydrous conditions a monoazo dyestuff, the azo linkage of which interconnects two aryl nuclei selected from the group consisting of benzene and naphthalene nuclei, the said monoazo dyestuff bearing a single hydroxy group in ortho position to the said azo linkage and also bearing a sulfonic acid group as single substituent which reacts with phosphorus halides, and recovering the sulfonic acid bromide thus formed.

4. A process for preparing a functional derivative of a monoazo dyestuff sulfonic acid which comprises reacting with phosphorus oxychloride in an inert diluent under substantially anhydrous conditions a monoazo dyestuff, the azo linkage of which interconnects two aryl nuclei selected from the group consisting of benzene and naphthalene nuclei, the said monoazo dyestuff bearing a single hydroxy group in ortho position to the said azo linkage and also bearing a sulfonic acid group as single substituent which reacts with phosphorus halides, and recovering the sulfonic acid chloride thus formed.

5. A process according to claim 1, wherein the sulfonic acid halide is further condensed with a member selected from the group consisting of a primary amine and a secondary amine.

6. A process according to claim 1, wherein the sulfonic acid halide is further reacted with a phenol.

7. A process according to claim 1, wherein the azo dyestuff contains the radical of a 2-hydroxynaphthalene sulfonic acid bound in 1-position to a radical of the general formula

R—N=N— in which R stands for a radical of the benzene series.

8. A process according to claim 1, wherein the azo dyestuff contains the radical of a 2-hydroxynaphthalene-3-carboxylic acid arylamide bound in 1-position to a sulfonated radical of the general formula

R—N=N— in which R stands for a radical of the benzene series.

References Cited in the file of this patent

UNITED STATES PATENTS

| | | |
|---|---|---|
| 2,423,572 | Woodward | July 8, 1947 |
| 2,443,314 | Haddock et al. | June 15, 1948 |
| 2,559,670 | Schroeder et al. | July 10, 1951 |